United States Patent [19]

Scheib

[11] 4,334,691
[45] Jun. 15, 1982

[54] SLEDGE WITH TILTABLE RUNNERS

[76] Inventor: Rudi Scheib, Panoramastrasse 13, D-7900 Ulm, Donau, Fed. Rep. of Germany

[21] Appl. No.: 37,252

[22] Filed: May 9, 1979

[30] Foreign Application Priority Data

May 12, 1978 [DE] Fed. Rep. of Germany ....... 2820803
Nov. 11, 1978 [DE] Fed. Rep. of Germany ....... 2848959
Feb. 21, 1979 [DE] Fed. Rep. of Germany ....... 2906628

[51] Int. Cl.³ ............................................ B62B 13/12
[52] U.S. Cl. .................................. 280/21 A; 280/12 F
[58] Field of Search ....................... 280/21 A, 21 R, 16, 280/12 F, 15, 12 H, 25, 27, 87.01, 22, 17, 12 R

[56] References Cited

U.S. PATENT DOCUMENTS

| | | | |
|---|---|---|---|
| 2,525,833 | 10/1950 | Schiffbauer | 280/16 |
| 2,589,764 | 3/1952 | Basso | 280/21 A |
| 3,119,131 | 1/1964 | Yoder | 280/21 A |
| 3,329,440 | 7/1967 | Tonelli | 280/21 R |
| 3,370,862 | 2/1968 | Huffnagle | 280/21 R |
| 3,370,863 | 2/1968 | Schrall | 280/21 R |
| 3,667,772 | 6/1972 | Eggbert | 280/22 |
| 4,036,506 | 7/1977 | Scheib | 280/21 A |
| 4,219,207 | 8/1980 | Muir et al. | 280/21 A |

FOREIGN PATENT DOCUMENTS

| | | | |
|---|---|---|---|
| 173615 | 1/1953 | Austria | 280/21 A |
| 477734 | 4/1928 | Fed. Rep. of Germany | 280/21 A |
| 923474 | 2/1955 | Fed. Rep. of Germany | 280/21 A |
| 645308 | 9/1962 | Italy | 280/21 A |
| 193810 | 1/1938 | Switzerland | 280/12 F |

*Primary Examiner*—David M. Mitchell
*Attorney, Agent, or Firm*—Steele, Gould & Fried

[57] ABSTRACT

A sledge with ski-like runners, which are mounted on bracket-like transverse connecting members by means of inclined tilt axes. The runners are tilted in the same direction when travelling along inclined ground or when riding round curves the runners being simultaneously displaced longitudinally relative to one another. A seat is mounted on the connecting members and is thereby displaced and inclined. The runners can be mounted in a light ploughing position and with a pre-tilting, so that the runners in the neutral or straight position will run on their inner edges.

30 Claims, 19 Drawing Figures

SLEDGE WITH TILTABLE RUNNERS

BACKGROUND OF THE INVENTION

The invention relates to a sledge with tiltable runners.

A sledge of this kind is described in DE-OS No. 26 07 748. With such sledges, the pitching moment which occurs when travelling fast or round tight bends or along slopes can be neutralized and the maneuverability can be improved, compared with ordinary sledges. Tilting occurs in these sledges about tilt axes extending horizontally, i.e. in the longitudinal direction of the sledge, and parallelism is ensured, when both runners tilt, by means of a parallelogram-shaped guide.

SUMMARY OF THE INVENTION

The aim of this invention is to improve the known design with a view to improving its operation, making it easier to steer and simpler to produce.

This aim is achieved, according to the invention, in that each runner is attached to at least one of the connecting members via at least one inclined tilt axis in such a way that at least the corresponding portions of each runner are movable longitudinally relative to each other on tilting, substantially in the longitudinal direction.

Thus, in the sledge according to the invention, tilting of the ski-like, i.e. flat and relatively wide, runners occurs automatically when the two runners are moved longitudinally towards each other. The inclined arrangement of the axes also ensures that the two runners are guided parallel to each other on tilting, without any need for an additional parallelogram-shaped guide or the like.

Preferably, a seat is provided, which is connected to at least one connecting member. In a particularly preferred embodiment, the seat is hinged to at least two connecting members. The seat may thus constitute an additional connection between the two connecting members and, in another preferred embodiment, is designed so that it can be raised and/or inclined when the runners move into their tilted positions. As a result, the inclination produced when traveling around bends or on slopes can be balanced out naturally by the user, and yet a stable central position is obtained. This means that the sledge always tends to return to the central position, i.e. the position for travelling straight ahead, without any action on the part of the user.

According to one embodiment of the invention, the sledge can be constructed so that at least two connecting members are attached to a one-part runner on each side, while each runner has an inclined tilt axis. A sledge of this design is particularly simple in construction and can be steered by the inclined position of the runners, by a shifting of the rider's weight and/or by a special construction of the runners, e.g. by a widened portion in the region of their front ends. The inclined seat is particularly advantageous here and can be adapted to the prevailing conditions by means of correspondingly inclined connections between the seat and the connecting members.

It is possible to provide all the joints between the connecting members and the runners (i.e. four, in the case of two connecting members) with the inclined tilt axes, but a single inclined tilt axis on each runner is sufficient, while the other connections can be made by means of other joints with several degrees of freedom, such as, for example, ball and socket joints, elastic connections such as rubber bearings, etc.

According to two particularly preferred features of the invention the runners, instead of being parallel, may be at a smaller spacing from each other at the front than at the back and/or may be tilted, in their neutral position (i.e. straight position), so that their inner edges are lower than the outer edges.

Both the slight ploughing position and the forward tilting mean that on the one hand the sledge can travel with great stability of direction and on the other hand can be steered round bends deliberately by a corresponding shift of weight. Each of these features by itself will result in an improvement of the kind which the invention sets out to achieve, but they work to particular advantages when combined.

The ploughing position may be achieved by making the transverse spacing between the tilt axes of the front connecting members smaller than that of the rear connecting members. However, as the deviation of the longitudinal directions of the runners from the central line of the sledge is preferably relatively slight, less than 4°, it may be sufficient for the front joints to be mounted more towards the outer edge and the rear joints more towards the inner edge of the runners, while the tilt axes are at the same transverse spacings from one another, i.e. with the connecting members being indentical and having tilt axes provided thereon.

Advantageously, the forward tilting of the runners is such that when the runners are tilted, i.e. on the slope or on a bend, the foremost runner (downhill runner on the outside of the curve) is more tilted than the other runner. This, too, improves the performance on bends. Forward tilting can be achieved in various ways. On the one hand, by a corresponding design of the fittings attached to the runners it is possible to obtain an inclined position of the runners, e.g. by means of inclined abutment surfaces or intermediate wedges. However, it is also possible to use the self-tilting effect of the tilt axes to achieve this.

Thus, each tilt axis can be arranged as to lie not only in a first plane, which is perpendicular to the travel surface of the sledge but in a second plane as well, which is perpendicular to the abutment surface of the runner. The first and second planes are forming an angle of less than 10° between each other. For this purpose the parts guiding the tilt axis can be mounted on the runners, the connecting members or on both, in such a way that they extend at an angle, again preferably less than 10°, relative to a perpendicular plane of symmetry of the sledge.

It has also been found that another advantageous feature contributing to the solution of the problem according to the invention consists in the seat of the sledge being moved out of the neutral position in the direction of the foremost runner, i.e. the downhill runner on the outside of the curve, when the runners are tilted. As in the main patent, this inclination may be effected towards the other runner, but the movement towards the downhill runner, or the runner on the outside of the curve, gives a better distribution of weight which favorably affects the steering properties. This movement can be effected in various ways, but is advantageously obtained by having the inclined seat-attachment axes offset to the rear, relative to the tilt axes. Thus, the movement occurs automatically with the inclination of the connecting members.

According to another embodiment of the invention, the runners may be subdivided in the longitudinal direction and portions of the runners, preferably the front portions, may be capable of being deflected out of the runner axis of the other (preferably rear) runner portions, whilst the deflectable runner portions remain substantially parallel to one another and are preferably not displaced relative to one another in the longitudinal direction. Preferably, the front runner portions are connected to the rear ones via cardan-type joints. Thus, in this embodiment, the sledge is controlled by varying the longitudinal direction of the front and rear runner portions relative to one another.

Other advantages and features of preferred embodiments of the invention are given in the claims and description, in conjunction with the drawings.

BRIEF DESCRIPTION OF THE DRAWINGS

Exemplary embodiments of the invention are shown in the drawings and described in more detail hereinafter.

The drawings show.

DETAILED DESCRIPTION OF THE PREFERRED EMBODIMENTS

In all the embodiments, comparable parts bear the same reference numerals and references are made to the fact that they are described in other embodiments.

Figure 3:
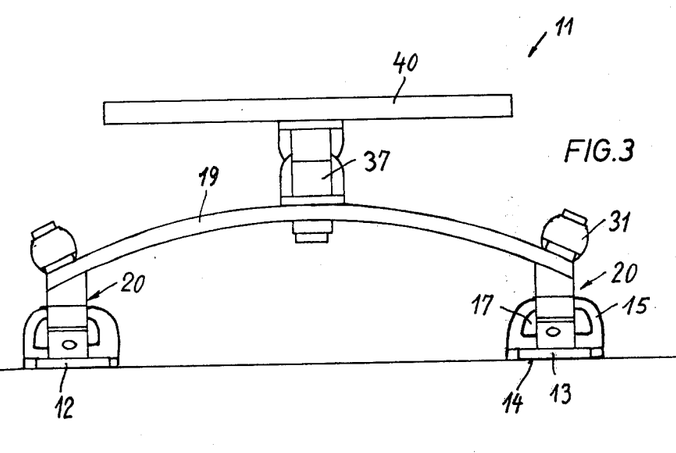
FIG. 3 a rear view of the sledge in FIG. 1 with its runners untilted.
Figure 4:
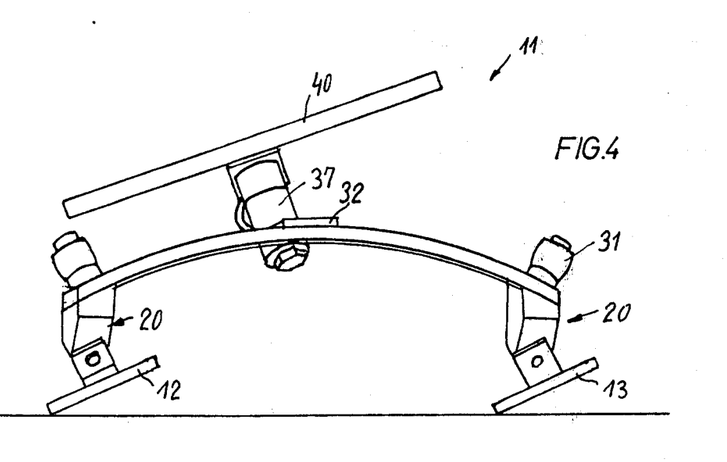
FIG. 4 a rear view of the rear part of the sledge in FIG. 1, with tilted runners, FIG. 5 a plan view of the sledge in FIG. 1 in the position with the runners tilted, and with the seat indicated only by broken lines, FIG. 6 an alternative embodiment of the attachment of the seat, in side view, FIG. 7 a rear view of the embodiment in FIG. 6, FIG. 8 a plan view of another embodiment of a sledge, FIG. 9 a sledge, on the line IX—IX in FIG. 8, FIG. 10 a plan view of two inwardly tilted runners, in the ploughing position, of another embodiment, and the fittings mounted thereon which are arranged so as to achieve this position, FIG. 11 a plan view in a direction perpendicular to the travel surface of the runners (in the direction of arrow XI in FIG. 12), FIG. 12 a view along the line XII—XII of FIG. 10 further including the embodiment shown in FIGS. 10 and 11, FIG. 13 a view according to FIG. 12, in the position for travelling on bends or slopes, FIG. 14 a side view of another embodiment of a sledge, and FIG. 15 a detailed section on the line XV—XV in FIG. 14, FIG. 16 a side view of another embodiment of the invention, FIG. 17 a detailed section on the line XVII—XVII in FIG. 16, FIG. 18 a plan view of a sledge according to FIG. 16 with the runners deflected for travelling on bends and with the seat shown only by broken lines, and FIG. 19 a perspective view of the sledge in the position according to FIG. 18.
Figures 5, 6, 7:
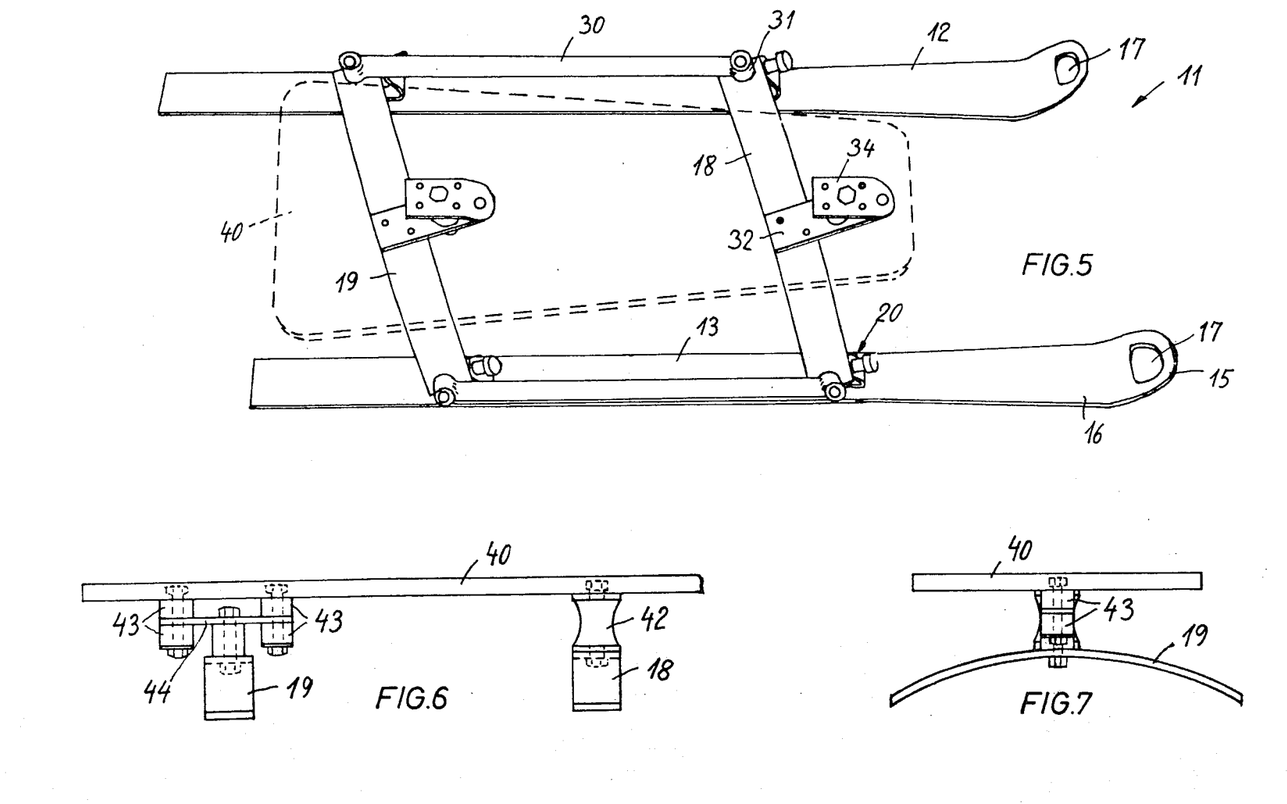

The sledge 11 shown in FIGS. 1 to 5 has two one-part ski-like runners 12, 13 which have a relatively wide, flat abutment surface or travel surface 14, defining a runner abutment plane, and, at their front ends, comprise an upwardly curved blade 15 with gripping holes 17, and which can also be used for positioning the rider's heels. The front region 16 of the runners is widened (FIG. 5).

The runners 12, 13 are joined together by means of two bracket-like connecting members 18, 19, preferably resilient so as to absorb impact, which act on the runners via joints 20.

In the example shown, the joints 20 consist of inclined U-shaped brackets 21 attached to the runners (cf. in particular FIG. 2), in which an articulation member 22 is mounted so as to be pivotable about a bolt 23. Th bolt 23 is forced into the position shown in FIG. 2 by means of a spring 24 mounted in a recess of the articulation member 22, whilst its end 25 engages in a hole on one leg and its thickened head 26 engages in an enlarged hole portion on the other leg of the bracket 21. A narrower opening 27 (FIG. 1) leads outwards from the enlarged hole portion. When the bolt is tightened counter to the spring force 24 (towards the top left in FIG. 2) the end 25 and the head 26 come out of their corresponding holes and the articulation member 26 can be pulled out of the bracket 21, with the thinner part of the bolt 23 running through the narrow opening 27. Such a "quick-release connection" joint enables one to easily remove the runners from the connecting members for transporting. It will be appreciated that the bolt 23 is arranged pointing diagonally upwards in the direction of travel 28 and thus fixes an inclined tilt axis 29 which is inclined at an angle of 20° to 60°, preferably 30° to 40° relative to the abutment surface 14 of the runner, but extends in a longitudinal plane which is perpendicular to the runner abutment surface. In the example shown, both sides of the connecting members 18, 19 are connected to the runners by means of joints 20 via inclined tilt axes 29, of which the two axes associated with a runner extend in the same perpendicular plane. However, one joint on each runner could also be replaced by another joint not having an axis inclined in the same direction but having several degrees of freedom instead, such as for example ball and socket joints, rubber joints or the like. To achieve the desired action only one joint with an inclined tilt axis is required for each runner, and these two joints may be mounted on the same or different connecting members (also diagonally).

The two connecting members 18, 19 are connected to each other in their outer region, substantially above the runners, by means of rod-shaped longitudinal connections 30. The longitudinal connections 30 are not required for guiding the connecting members or the runners, but serve primarily as handles and steering means. They are connected to the connecting members 18, 19 via universal joints 31. However, it would also be possible to use a bearing with a similar inclined guide to that of the joint 20, or an elastic hinged connection, such as a rubber bearing or cardan bearing.

In the centre of the arc-shaped curved connecting members 18, 19 are provided seat-supporting arms 32 which project forwards from the connecting members. They are bent into a hook shape and comprise at their front end a receiving bore for a bearing pin 33 which is mounted on a seat attachment fixture 34. Attached to this fixture, by means of a screw 35 and an intermediate member 36, there is an elastic member consisting of two rubber elements 37, 38 in the form of thick discs or hollow cylinders through which the screw 35 projects and which hold between them a seat-support arm. The screw 35 projects through an opening of the seat support arms and is attached to the seat attachment fixture via the intermediate member 36.

The bearing pin 33 is inclined at an angle to the horizontal (travel surface 14) and forms, together with the elastic element, a bearing about a seat attachment spindle 39 which points in the same direction as the tilt axis 29 but is somewhat more sharply inclined. Both of the seat attachment axes 39 lie in a vertical, central longitudinal plane, when the sledge is in the straight position. The axis 39 is formed by the connection between the inclined pin 33 and the point of intersection of the central axis of the screw 35 with the seat support arm 32. The seat attachment axis 39 could also consist of simple hinge-like joints corresponding to the joints 20, which are correspondingly inclined. However, the embodiment given here balances out any inaccuracies of alignment or assembly, on the one hand, and also provides a recoil force which urges the seat and hence the entire sledge into the position aligned straight ahead, if there are no external forces in play. On the seat attachment fixtures 34 is mounted a seat 40, in the form of a board tapering slightly trapezoidally in the forward direction. The seat can be adapted to the intended use of the sledge, in its form and materials, and may, for example, also be made from a profiled plastics bowl. However, a substantially flat seat has the advantage that the rider can travel on the sledge either in a sitting or lying position.

The operation of the sledge according to FIGS. 1 to 5 is as follows: In the straight position shown in FIG. 1, the two runners are not offset and in this embodiment they are located parallel to each other and both of their travel surfaces 14 are in the same plane. The seat is positioned centrally above the runners and the surface of the seat is parallel to the travel surfaces 14. The rider can sit or lie on the sledge and can either grip the gripping holes 17, the front crosswise support 18, handles provided thereon or the longitudinal connections 30 with his hands or can position his heels in the holes 17 or on the front crosswise support 18.

When travelling at an inclination relative to the slope (travelling on sloping ground outside the line of dip) and when riding around curves, the runners can be moved out of the straight position shown in FIG. 3 into the tilted position shown in FIG. 4. This can be done by the rider, by shifting his center of gravity and thus inclining and displacing the surface of the seat, and/or by longitudinal displacement of the runners relative to each other. The connecting members, the longitudinal connections 30 or the runners themselves can be used as an aid to this displacement of the runners relative to each other.

If, in the embodiment shown, one runner, e.g. the one underneath in FIG. 5 or the one on the right in FIG. 4, is moved forwards relative to the other, the connecting members 18, 19 which have hitherto been at right angles to the runners move into a position at an inclined angle to the runners but remain parallel to each other, as do the runners. Owing to the inclination of the tilt axes 29, the runners are, however, tilted towards each other, i.e. upwards and forwards, at the inclination shown here, so that the foremost runner lies with its inner edge deeper and the rear runner with its outer edge deeper. This means that the sledge would abut on a flat surface with the edges described above. The degree of tilting depends, on the one hand, on the amount of longitudinal displacement of the runners relative to each other and, on the other hand, on the angle which the tilt axis 29 forms with the horizontal. The smaller this angle, the greater the tilting as a function of the angle which the connecting members form with the longitudinal axis of the runners.

The inclined position of the connecting members also causes the seat support arms to pivot. As can be seen from FIG. 5, the seat 40 is moved from its central position between the runners, in this exemplary embodiment, towards the rearward runner 12. The amount of displacement depends on how the pivot points of the joints 20 acting in this plane are located on the seat support arms, in relation to the point of articulation of the seat. If, as in this embodiment, the seat articulation point is moved a long way forwards by the seat support arms, the seat moves towards the runner 12. If the seat support arms were facing backwards, the reverse movement would occur.

The inclination of the effective seat attachment axes 29 not only displaces, but also pivots the seat, as can be seen in FIG. 4. In this embodiment, this pivoting occurs in such a way that the seat inclines towards the rearmost runner, i.e. the higher runner when travelling at an inclination on the slope, so that in this case the seat is less sharply inclined than the slope. The seat inclines more, the smaller the angle between the axis 39 and the horizontal. When travelling round bends, when the runners are inclined so that the edges of the inside of the curve are lower, just as in skiing, the seat again inclines towards the inside of the curve, corresponding to the natural curve position. Because of this geometry and, in particular, also because of the width of the runners, the rider's center of gravity is somewhat higher in the tilted position shown in FIG. 4 than in the non-tilted position in FIG. 3, despite the pivoting, with the result that the sledge always tries to return to the position shown in FIG. 3. The sledge is thus in a stable position of equilibrium of the forces. As has already been mentioned, this is helped by the flexible mounting of the seat by means of the rubber elements 37, 38.

Figure 1:
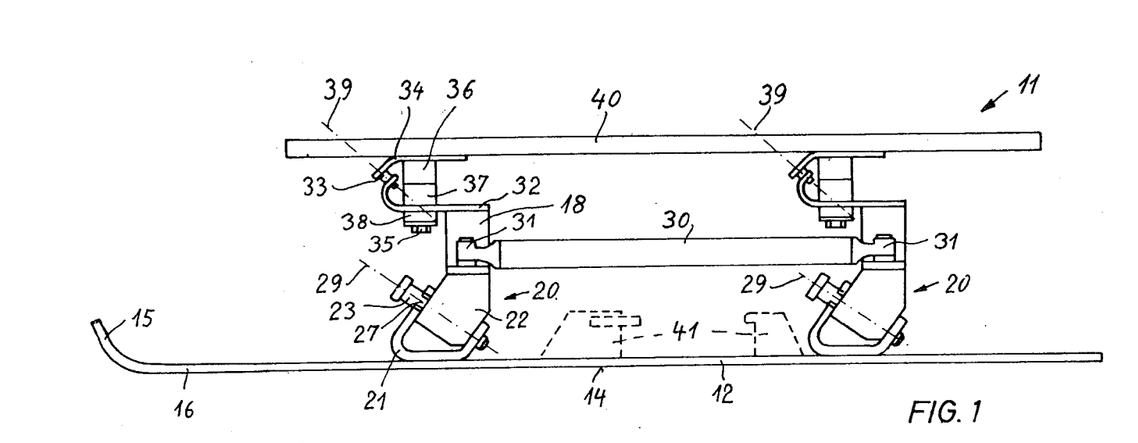
FIG. 1 a side view of a first embodiment of a sledge.
Figure 2:
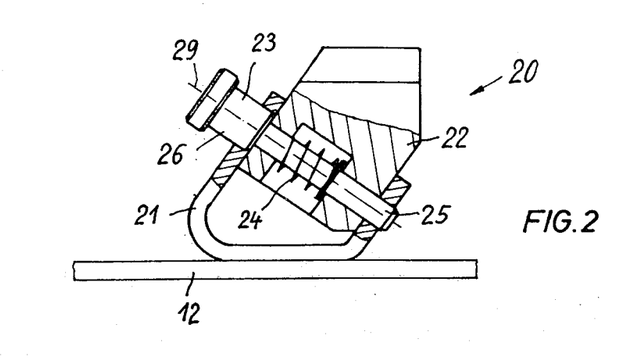
FIG. 2 a detail of a joint, partially in section.

FIG. 1 shows, with broken lines, that a ski binding 41 of conventional construction may be mounted on each runner. Since the runners can be removed from the connecting members 18, 19 which are connected to one another by the seat, the rider can strap them on like ordinary skis, and can carry the seat, e.g. when travelling by ski lift or moving through deep snow. It would also be possible to attach the ski bindings to fixed parts of the joints 20 attached to the runners, by constructing them in this way, or to make the bindings capable of being hooked on to this part.

Steering of the sledge is effected by means of the varying conditions of load on the runners or by the tilting thereof, and is effectively aided by the widening of the runners in the front region. In particular, if the rider is inexperienced, he can also use his feet to help him steer, in the usual way.

FIGS. 6 and 7 show a means of attachment of the seat 40 wherein the seat is not forced to move or pivot relative to the connecting members 18, 19. On one side it is connected to the connecting members via a rubber element 42 and at the rear via a bridge with rubber elements 43. The bridge 44 is connected to the connecting member 19 via an axis 45 and screws and is in the form of a plate enclosed on both sides by the rubber elements 43 which in turn are attached to the seat 40 via screw bolts. This connection means that the seat is resiliently mounted and can be tilted to the right and left by the rider to some extent and can also rotate relative to the connecting members to such an extent that it remains in the longitudinal axis of the sledge when pivoting occurs. The inclination of the seat is independent of the tilting of the edge. The bridge 44 is only mentioned by way of an example. A conventional rubber spring and damping element 42 could also be used on this side, as shown on the connecting member 18.

Figure 8:
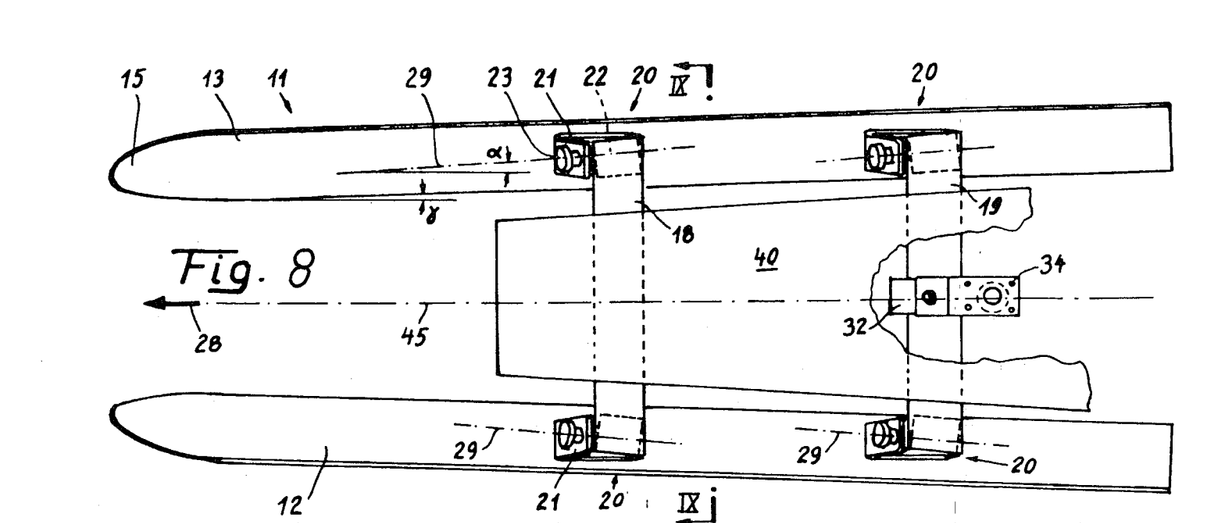
Figure 9:
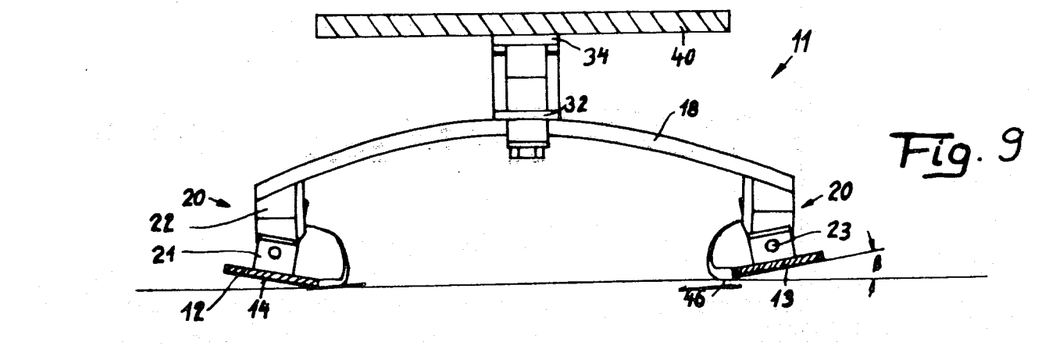

Whereas in FIGS. 1 to 5 the tilt axes 29 extended in one plane which was parallel both to the vertical central plane and also to a plane extending at right angles to the travel surface 14, in the preferred embodiment according to FIGS. 8 and 9 the axis 29 is indeed located in a plane (FIG. 9) at right angles to the abutment surface 14 of the runner, but, as shown in FIG. 8, it is inclined relative to a vertical central plane shown by the center line 45 in FIGS. 8 and 9, and indeed the axes 29 extend towards each other in the direction of travel 28. This is achieved by the fact that the articulation members 22 are mounted at an inclined angle at both ends of the connecting members 18, 19 and also converge in the forwards direction. As a result of the co-operation of the parallel connecting members 18, 19, the inclined joints 20 and the runners, the tilting of the runners as shown in FIG. 9 is obtained in the neutral position in which the two runners are located side by side, without being offset, in the direction of travel 28. Thus, in this neutral or straight position, the runners are tilted inwards to some extent and run on their inner edges 46.

The angle $\alpha$ for the inclination of the axes as shown in FIG. 8 should be less than 10°, as should the angle $\beta$ of the inclination of the runners.

It will also be seen that the runners are not parallel to the direction of travel 28 but form an angle $\gamma$ therewith which is preferably less than 4°. The plough position of the runners thus obtained helps to stabilize the direction and improve the steering qualities. In FIGS. 8 and 9, this plough position is obtained in that, with the connecting members 18, 19 being of identical construction in all other respects, they are mounted offset on the runners 12, 13, with the brackets 21 of the front joints 20 being nearer the outer edge and those of the rear joints being mounted more towards the inner edge of the runner.

Figure 13:
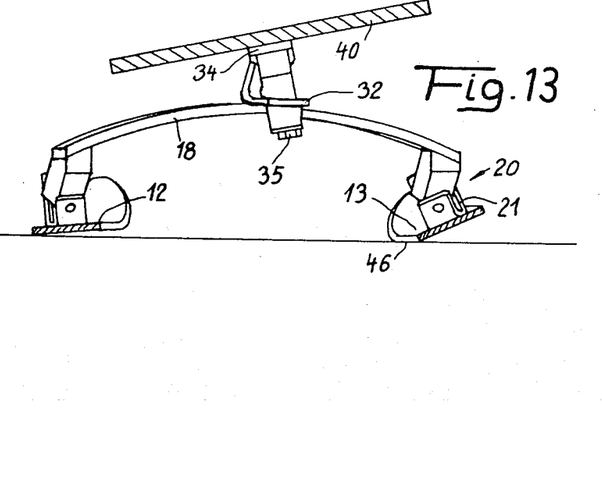

As shown in FIG. 13, with regard to the attachment of the seat 40, the difference compared with FIGS. 1 to 5 is that, because the seat attachment axis 39 is mounted away from the direction of travel, i.e. rearwards, in relation to the tilt axis 29 and hence the joints 20 and connecting members 18, 19, the seat 40 moves towards the runner which is the foremost runner, i.e. the downhill runner or the one on the outside of the curve, when in a position for travelling round bends or on slopes. This runner is thus under greater stress from the weight of the sledger owing to the movement of the seat in this direction, and this also helps to improve the travel characteristics.

The embodiments according to FIGS. 10 to 15 correspond to the one in FIG. 8 in all respects except for the mounting of the joints 20, which are in themselves the same, on the runners or connecting members 18, 19.

Figure 10:
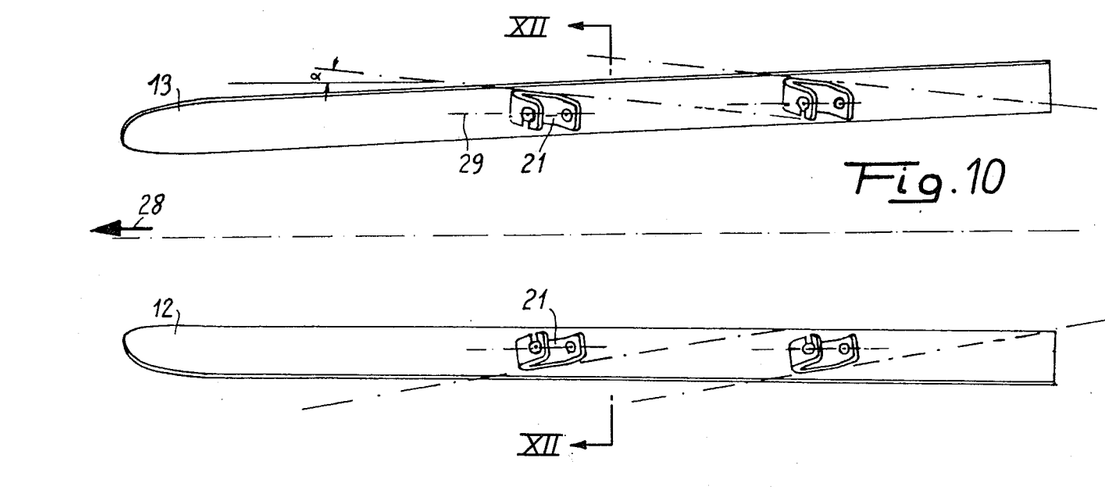
Figure 11:
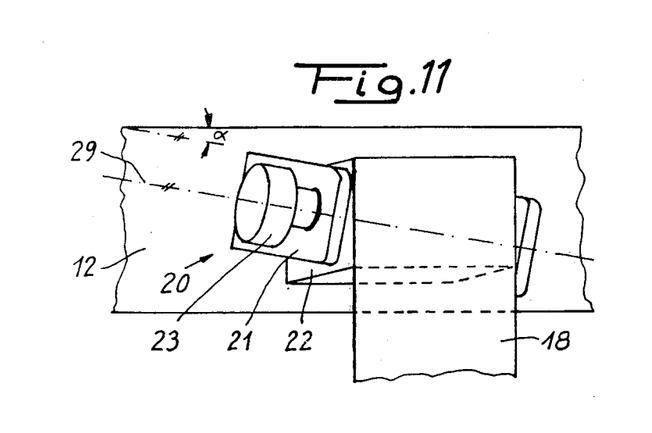
Figure 12:
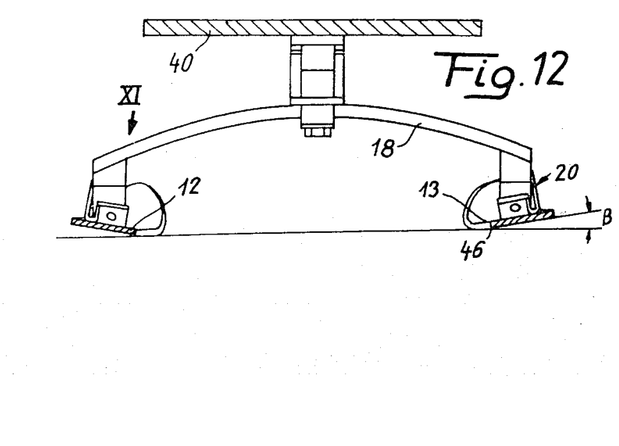

FIGS. 10 and 11 show that the tilting of the runners in the neutral position (FIG. 12) is achieved by the fact that the brackets 21, i.e. the elements of the joints 20 which are attached to the runner, are mounted at an inclined angle $\alpha$ relative to the longitudinal direction of the runners. As in the embodiment according to FIGS. 8 and 9, this angle can also be based on the direction of travel 28, and the plough angle $\gamma$ merely has to be taken into account. The articulation members 22 are mounted on the connecting members 18, 19 so that, in a vertical plan view on to the tilted runners, they point in the direction of travel. To simplify the drawing, in FIG. 10 the connecting members, the seat and the articulation members have been omitted. However, FIG. 11 shows how the bore pointing in the direction of travel co-operates with the bracket which is mounted in an inclined position, and thus the axial inclination for the angle $\alpha$ is formed, which again results in the tilting of the runners, shown in FIG. 12, in the neutral position, by an angle $\beta$ (less than 10°).

FIG. 13, which has already been explained with regard to the inclination and displacement of the seat, shows a position for travelling on a slope or round bends, wherein displacement of the runners relative to each other in the direction of travel causes tilting of the runners, both runners being tilted in the same direction. However, owing to the forward tilting (FIG. 12), the advanced runner 13 which is the downhill runner or the one on the outside of the curve, is tilted more than the rear, uphill runner 14, i.e. the one on the inside of the curve. The runner on the inside of the curve still travels on its inner edge at the start of the tilting and travels through a position in which it lies flat on the ground into the position shown in FIG. 13, in which it runs on its outer edge.

Figure 14:
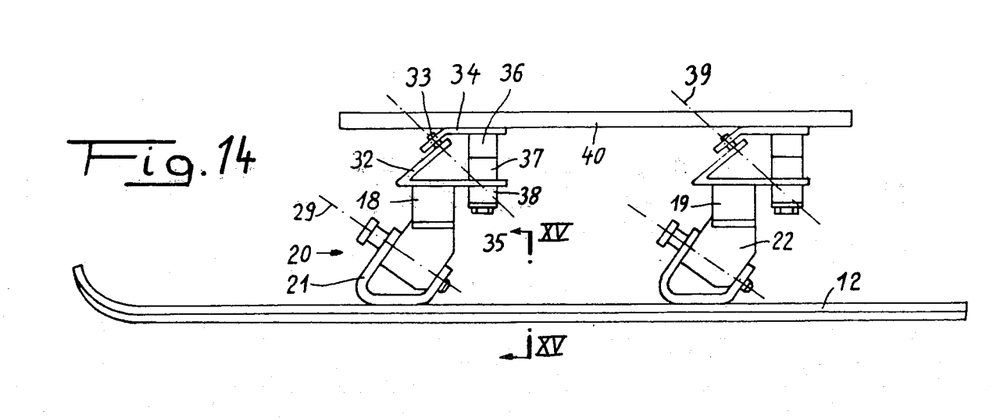
Figure 15:
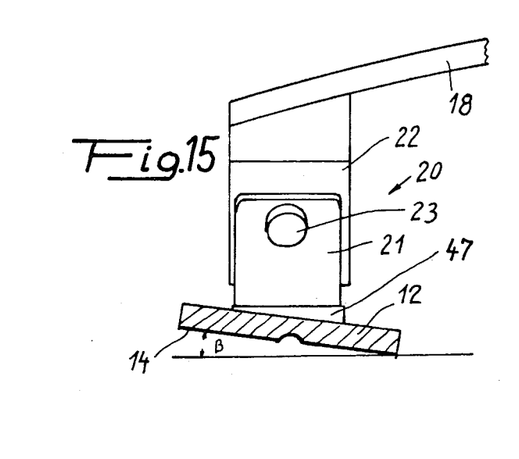
Figure 16:
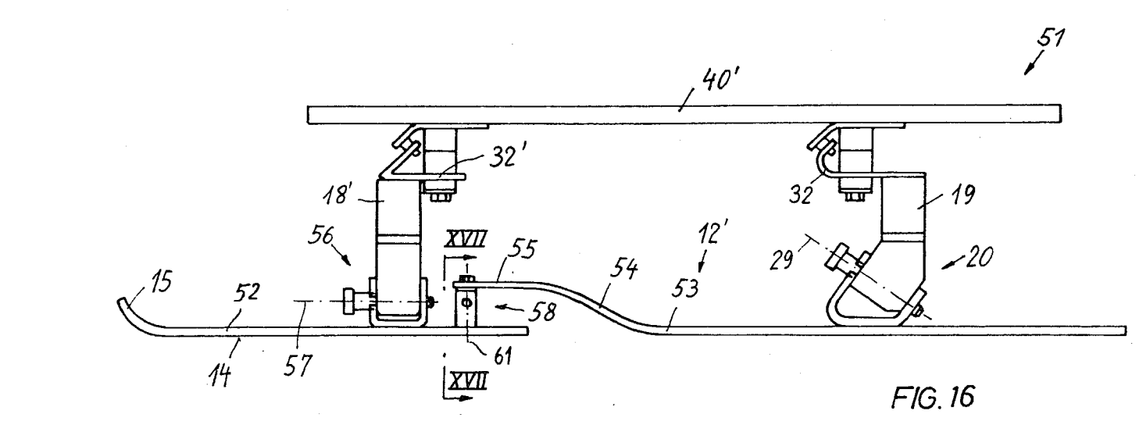

In the embodiment according to FIGS. 14 and 5, the difference is that the joints 20 (which are otherwise identical to those in FIGS. 8 to 13) are mounted so that the axes 29 are parallel to the central plane 45 or to the longitudinal direction of the runners, which is only slightly different therefrom. The parts of the joint 20 which is fixed to the runner, i.e. the bracket 21, is however mounted on the runner by means of a wedge 47 (FIG. 15) in such a way that this runner takes up the desired position of tilt by an angle $\beta$. The forward tilting of the runners can thus be achieved in various ways without substantially modifying the joints. It would even be possible to provide adjustment means such that the sledge could be adapted to suit different terrains or requirements for use. Thus, for example, in the embodiment according to FIG. 15, the bracket 21 could be attached to the runners by means of a hinge so that the inclination could be adjusted using an adjustment screw. The same applies to the plough position. In the embodiment according to FIGS. 10 to 13, the plough position is obtained by means of connecting members 18, 19 of different lengths, so that the spacing between the joints 20 at the front is smaller than at the back. The tilting and the plough position can be used not only individually but also in combination, and the various ways of obtaining these positions of the runners can be combined with one another as desired. For example, a marked plough position can give the sledge greater natural deceleration on icy or steep routes, for instance.

By a correspondingly reversed inclination of the tilt axes it is also possible to effect the same tilting by displacement of the other runner, so that the downhill runner, i.e. on the outside of the curve, is not moved forwards as in the exemplary embodiment, but back. In this case, the definitions relating thereto must be altered accordingly.

FIGS. 16 to 19 show a sledge in which the runners 12', 13' consist of front and back portions 52, 53. In its front region the rear runner 53 has an upwards curvature 54 and an adjacent horizontal portion 55 in a higher position.

The rear runner portion 53 is connected to a connecting member 19 via two joints and the seat 40' is connected to the connecting member 19 via a seat attachment joint which, like the connecting member 19 and the joints 20, corresponds to the one described in FIG. 1.

Figure 17:
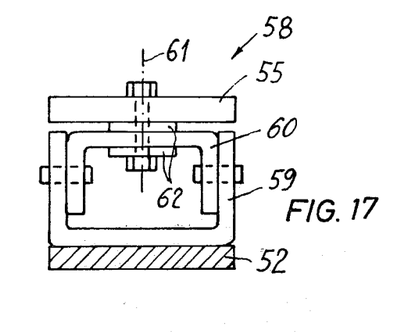
Figure 18:
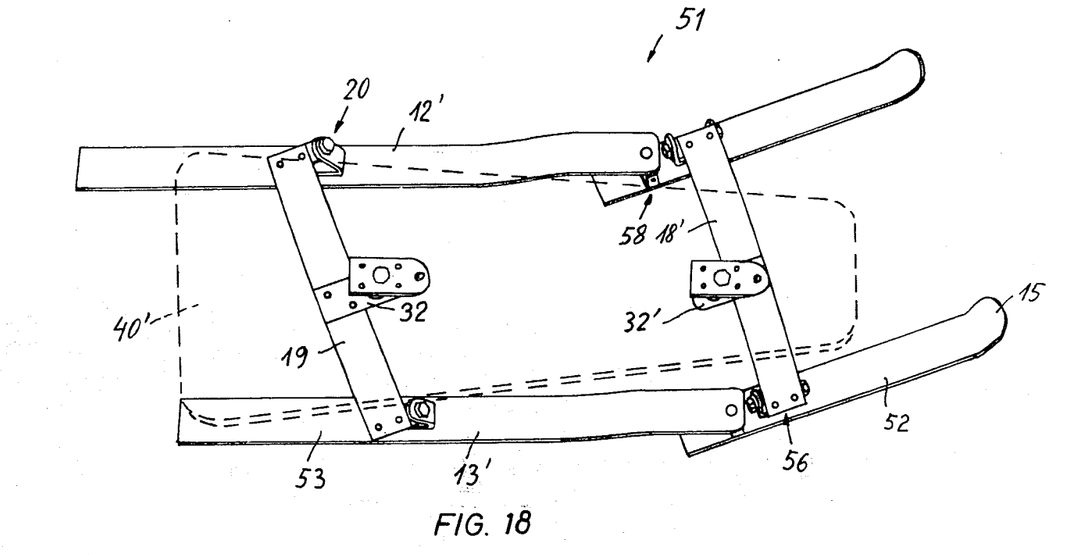
Figure 19:
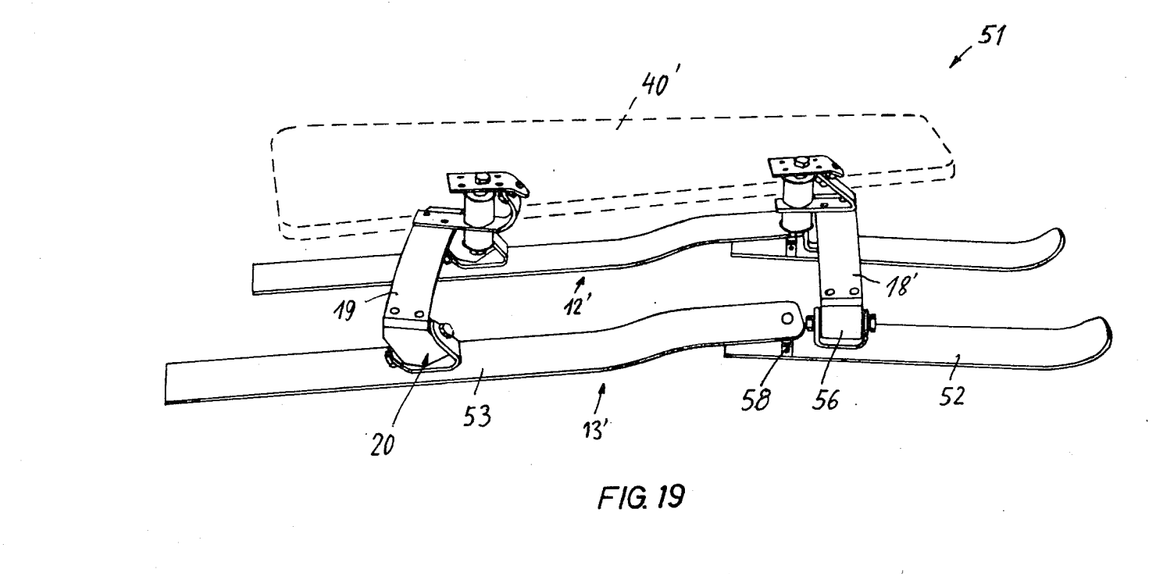

The front runner portions 52 are short, ski-like runner portions with a blade 15 which is not perforated in this example. Moreover, the runners are not wider at the front. The runner portions 52 are connected to a connecting member 18' via joints 56. The joints 56 correspond to the joints 20 described above in their construction, but the axis 57 of the joints is horizontal, i.e. it extends in the longitudinal direction of the runners. The front and rear runner portions 52, 53 are connected by means of a cardan-type joint 58 mounted on the rear end of the front runner portion 52 and connecting the latter with the horizontal portion 55 of the rear runner portion in such a way that these runner portions can indeed move relative to one another about a horizontal and vertical axis at right angles to the longitudinal direction of the runners, but the runner abutment surfaces remain parallel to each other. This therefore means that the tilting of the rear runner portions 53 is transmitted to the front runner portions by the joint 20, even if mutual deflection occurs. A joint of this kind is shown in FIG. 17, which consists of a U-shaped bracket 59 attached to the runner portion 52, an intermediate member 60, also U-shaped, fixed therein by means of horizontal bearing pins, and a vertical axis 61 which is connected to the portion 55 of the rear runner portion 53 via interposed sliding discs 62. Since, in this case, the chief movement is a pivoting about the vertical axis 61 in FIGS. 16 and 17, the pivoting about the two horizontal axes could be dispensed with if elastic elements were provided to give a corresponding resilient mobility. In any case, it is preferable for all the joints to have some elasticity and resilient mobility so that inaccurate alignment, which can be caused by any bending occurring in operation, can be balanced out, as well as any unevenness of the ground or the like.

The attachment of the seat at the front is obtained by means of a joint the basic construction of which corresponds to that of the rear seat attachment joint. However, in this case, the seat support arm 32' is mounted to the rear, in relation to the connecting element 18'. The axis which determines the movement of the seat and its longitudinal alignment relative to the sledge 51 is in this case the axis 61 or the plane between the two axes 61 on either side of the sledge.

The method of operation of the embodiment according to FIGS. 16 to 19 is as follows: On being steered, which can be effected by a shifting of weight and/or by direct action on the front connecting element 18' or the runners, the two front runners 52 which are connected by the connecting member 18', are pivoted parallel to one another without moving longitudinally relative to one another. This is effected by means of the horizontal pivot axes 57. Since the rear runner portions 53 are tensionally connected to the front ones via the joints 58, these latter portions follow and thus move longitudinally relative to each other. This results in an inclined position of the rear connecting member 19 which causes tilting of the rear runner portions via the inclined axes 29 of the joints 20, and this tilting is also transmitted to the front runner portions 52 via the joint 58. The seat meanwhile is inclined in the same way as described in the first embodiment, i.e. towards the inside of the bend, while the runners are tilted so that the inner edges of these runners touch the ground (if the ground is flat). Thus, the phenomenon of the outer edges gripping the ground, which could lead to the sledge turning over, does not occur here when travelling round bends.

Because the joints 58 are on the rear part of the front runner portions, there is a good, tight adherence to the course, and this means that higher speeds can be reached.

All possible steering aids such as steering rods, handles, footrests and the like may be provided. Since the two connecting members can be pivoted parallel to each other, in spite of the different methods of operation of the front and rear joints, it is also possible to provide connecting rods 30 which can also be used for steering. These are particularly useful for holding on to the sledge. The present embodiment, with runners which are parallel in the front region and movable without moving longitudinally relative to each other, is particularly preferred. However, it would also be possible to guide the rear runners parallel to each other and make the front runners longitudinally movable relative to each other, by using joints with inclined axes.

I claim:
1. A sledge, comprising:
at least two runners defining a longitudinal axis of the sledge;
at least two connecting members having joints at each end for interconnecting the runners; and,
at least one of the joints on each runner having means defining a tilt axis inclined in a generally vertical plane, each tilt axis providing compound rotational components, whereby upon relative rotational movement of the runners and at least one of the connecting members about effective vertical axes, during which the tilt axis means of the respective runners necessarily move in opposite longitudinal directions together with the runners relative to one another, the runners simultaneously tilt about effective horizontal axes.

2. A sledge according to claim 1, wherein the connecting members are parallel to one another throughout the relative rotational movement.

3. A sledge according to claim 1, further comprising a seat hingedly connected to the connecting members independently of the runners.

4. A sledge according to claim 1, wherein the inclined tilt axes point upwardly in the direction of travel.

5. A sledge according to claim 4, wherein the runners have lower surfaces defining runner abutment planes and the inclined tilt axes form an angle of 20° to 60° with the abutment planes of the runners.

6. A sledge according to claim 1, wherein the connecting members are so constructed as to be resilient at least in the vertical direction.

7. A sledge according to claim 1, further comprising "quick-release" connections between the runners and the connecting members.

8. A sledge according to claim 7, wherein the tilt axes means comprise brackets and bolts engageable therewith.

9. A sledge according to claim 1, further comprising a seat tiltably connected to each of the connecting members and laterally movable towards that runner which has been pushed forward relative to the other when the runners have moved out of a neutral position.

10. A sledge according to claim 9, wherein the seat is connected to the connecting members by means defining at least one seat attachment axis which is arranged substantially in a vertical longitudinal plane and is inclined relative to the vertical when the runners are in the neutral position.

11. A sledge according to claim 10, wherein the direction of inclination of the at least one seat attachment axis is the same as that of the tilt axes of the joints interconnecting the runners and the connecting members, and the amount of inclination of the at least one seat attachment axis relative to the horizontal is greater than that of the tilt axes of the joints interconnecting the runners and the connecting members.

12. A sledge according to claim 1 further comprising a seat tiltably connected to each of the connecting members by means defining at least one inclined seat attachment axis mounted offset to the rear of the connecting members, relative to the joints at the ends thereof, whereby the seat is laterally movable towards that runner which has been pushed forward relative to the other when the runners have moved out of a neutral position.

13. A sledge according to claim 1, wherein the runners are closer to one another at the front than at the rear.

14. A sledge according to claim 13, wherein the transverse spacing between the axes of the joints on the frontmost of the connecting members is smaller than the spacing between the axes of the joints on the rearmost of the connecting members.

15. A sledge according to claim 13, wherein the axes of the joints of the respective connecting members are equally spaced, but the points of attachment of the joints of the frontmost of the connecting members are offset towards the opposite, outer edges of the runners, and the points of attachment of the joints of the rearmost of the connecting members are offset towards the inner edges of the runners.

16. A sledge according to claim 13, wherein the deviation of the runners from parallel, with respect to the longitudinal axis is less than 4°.

17. A sledge according to claim 1, wherein the tilt axes lie in converging planes, providing a neutral position wherein the runners are tilted so that their inner edges are lower than their outer edges and imparting a greater tilt to the advanced, downhill runner when the sledge travels around bends or on slopes.

18. A sledge according to claim 4, wherein the runners have lower surfaces defining abutment planes and the inclined tilt axes form an angle of 30° to 40° with the abutment planes of the runners.

19. A sledge according to claim 17, wherein each runner has a lower surface defining a runner abutment plane and the at least two runners together define a travel plane and each tilt axis lies in first and second planes, the first plane being perpendicular to the travel plane of the sledge and the second plane being perpendicular to the abutment plane of the runner, said first and second planes forming an angle of less than 10° between one another.

20. A sledge according to claim 19, wherein the tilt axes extend at an angle relative to the longitudinal planes which are perpendicular to the abutment planes of the runners so as to diverge in the forward direction at an angle of less than 10°.

21. A sledge according to claim 19, wherein the tilt axes means comprise brackets mounted on the runners, corresponding brackets of each connecting member forming a divergent angle towards the front, and each being fixed at an inclined angle to the upper surface of the runners.

22. A sledge according to claim 17, wherein each of the joints have tilt axes which are arranged on both sides of the connecting members in such a way that they extend at an angle relative to a vertical plane of symmetry.

23. A sledge according to claim 22, wherein the tilt axes are arranged so as to converge in the forward direction, the angle being less than 10° relative to the connecting members.

24. A sledge according to claim 1, wherein at least two connecting members are connected to a one-piece runner on each side, at least one inclined tilt axis being provided on each runner.

25. A sledge according to claim 1, wherein the runners are subdivided in the longitudinal direction and comprise first and second runner portions, the first runner portions being interconnected with a connecting member by joints enabling said first runner portions to be diverted out of the longitudinal axis of the second runner portions in order to steer the sledge, and the deflectable first runner portions remaining substantially parallel to one another, without moving relative to one another, in the longitudinal direction.

26. A sledge according to claim 25, wherein the second runner portions are connected to at least one connecting member by the inclined tilt axis means.

27. A sledge according to claim 25, wherein the first runner portions, which are not longitudinally movable relative to one another, are connected to one of the connecting members by joints having substantially horizontal longitudinal tilt axes means.

28. A sledge according to claim 25, further comprising "cardan-type" joints for connecting the first runner portions to the second runner portions.

29. A sledge according to claim 28, wherein the runners have lower surfaces defining abutment planes and the "cardan-type" joints have one axis which extends substantially perpendicularly to the abutment plane of the runners and another axis which extends parallel to the abutment plane of the runner and at right angles to the longitudinal axis.

30. A sledge according to claim 28, wherein each of the cardan joints is mounted at the rear end of the front runner portions.

* * * * *

UNITED STATES PATENT AND TRADEMARK OFFICE
CERTIFICATE OF CORRECTION

PATENT NO. : 4,334,691
DATED : June 15, 1982
INVENTOR(S) : Rudi Scheib

It is certified that error appears in the above—identified patent and that said Letters Patent are hereby corrected as shown below:

Column 2, line 16, "advantages" should read --advantage--.

Column 2, line 27, "indentical" should read --identical--.

Column 4, line 15, "Th" should read --The--.

Column 12, line 45, "axes" should read --axis--.

Signed and Sealed this

Tenth Day of August 1982

[SEAL]

Attest:

Attesting Officer

GERALD J. MOSSINGHOFF

Commissioner of Patents and Trademarks